United States Patent [19]

Freitag

[11] Patent Number: 5,623,101

[45] Date of Patent: Apr. 22, 1997

[54] PROCESS TO CORRECT A DIFFERENTIAL PRESSURE SIGNAL

[75] Inventor: Edmund Freitag, Hille, Germany

[73] Assignee: Mannesmann Aktiengesellschaft, Dusseldorf, Germany

[21] Appl. No.: 695,989

[22] Filed: Aug. 15, 1996

[30] Foreign Application Priority Data

Aug. 16, 1995 [DE] Germany .................. 195 31 926.5

[51] Int. Cl.[6] .................................................. G01L 19/04
[52] U.S. Cl. ................................................................ 73/708
[58] Field of Search ........................ 73/708; 364/571.01, 364/571.02, 571.03, 551, 558

[56] References Cited

U.S. PATENT DOCUMENTS

| | | | |
|---|---|---|---|
| 5,197,334 | 3/1993 | Guziak | 73/708 |
| 5,329,818 | 7/1994 | Frick et al. | 73/708 |
| 5,383,367 | 1/1995 | Bertrand et al. | 73/708 |
| 5,394,345 | 2/1995 | Berard et al. | 364/571.03 |

Primary Examiner—Richard Chilcot
Assistant Examiner—William L. Oen
Attorney, Agent, or Firm—Cohen, Pontani, Lieberman, Pavane

[57] ABSTRACT

A process for correcting differential pressure signals which takes into account the disturbance variables, temperature and static pressure, that influence the absolute pressure and thereby reduce the accuracy of the corrected differential pressure signals. A corrected differential pressure signal is recursively calculated from a measured differential pressure signal, a measured absolute-pressure signal and a temperature signal in combination with a plurality of lower degree correction polynomials. The corrected differential pressure signal may be further processed via a linearization polynomial to produce a linearization correction signal which, when combined with the corrected differential pressure signal, produces a linearization differential pressure signal. Recursivity in the calculation of the corrected differential pressure signal links residual errors into the correction process despite the use of relative simple lower degree correction polynomials. The use of lower degree polynomials renders the process especially suitable for execution on sequential machines.

12 Claims, 2 Drawing Sheets

PROCESS TO CORRECT A DIFFERENTIAL PRESSURE SIGNAL

BACKGROUND OF THE INVENTION

1. Field of the Invention

The present invention is directed to a process for correcting a differential pressure signal that depends on temperature and static pressure.

2. Description of the Related Art

Generic differential pressure measuring transducers are generally known and described, for example, in German patent publication DE 35 12 529. The electrical signal S, which is generated when the non-electrical variable of differential pressure ($dp=p_1-p_2$), representing the difference between a first process pressure $p_1$ and a second process pressure $p_2$, is converted into an electrical variable and has, as the result of specified material constants, the intended dependency $S_1=f(dp)$. In addition, the electrical signal S also has an undesired dependency $S_2=(f(p)$ on the absolute pressure $p=(p_1+p_2)/2$ and a undesired dependency $S_3=(f\theta)$ on the temperature $\theta$ in the differential pressure measuring transducer. Consequently the electrical signal $S=f(dp, p, \theta)$ is a function of the differential pressure dp, the absolute pressure p and the temperature $\theta$. The dependence of the electrical signal S on the absolute pressure p and the temperature $\theta$ distorts the particular converted measurement value in question. For this reason, the absolute pressure p and the temperature $\theta$ are described as disturbance variables. Compensating for these disturbance variables in the electrical signal S is the purpose of the invention.

In a sensor arrangement comprising a differential pressure sensor, a temperature sensor and a sensor for static pressure, it is known, as taught by European patent publication EP 0 178 368, to calculate a corrected differential pressure signal using a linear polynomial correction of the three original measurement signals for differential pressure, temperature and static pressure detected by the sensors. To accomplish this, the coefficients of the polynomial function, the weighted functions of temperature and static pressure, are stored in a read-only memory.

It is disadvantageous that this process uses, for the purpose of correction of the differential pressure signal, a measurement value that itself depends on other process parameters. Static pressure, the temperature-dependent measurement value which itself requires correction, is used to correct the differential pressure signal that depends on temperature and static pressure, thereby preventing accurate transformation of the actual differential pressure to the corrected measurement value. Therefore, it is desirable to improve the accuracy of known processes for correcting differential pressure signals that depend on temperature and static pressure.

SUMMARY OF THE INVENTION

It is accordingly an object of the present invention to provide a process to improve the accuracy of corrected differential pressure signals which depend on temperature and static pressure.

Another object of the invention is to provide an improved process for correcting differential pressure signals which depend on temperature and static pressure by the implementation of recursivity whereby residual errors are fed back into the correction process with inverted signs, despite the use of relatively simple lower degree correction polynomials.

Still a further object of the invention is to provide a process for correcting differential pressure signals using lower degree polynomials which are especially suitable for execution on sequential machines, in that the execution cycles are short in a manner proportionate to the degree of the polynomial.

The process for correcting differential pressure signals in accordance with the invention takes into account the disturbance variables, temperature and static pressure, that influence the absolute pressure and thereby reduce the accuracy of the corrected differential pressure signals. A corrected differential pressure signal is recursively calculated from a measured differential pressure signal, a measured absolute-pressure signal and a temperature signal in combination with a plurality of lower degree correction polynomials. The corrected differential pressure signal may be further processed via a linearization polynomial to produce a linearization correction signal which, when combined with the corrected differential pressure signal, produces a linearization differential pressure signal.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

DETAILED DESCRIPTION OF THE PRESENTLY PREFERRED EMBODIMENTS

Figure 2:
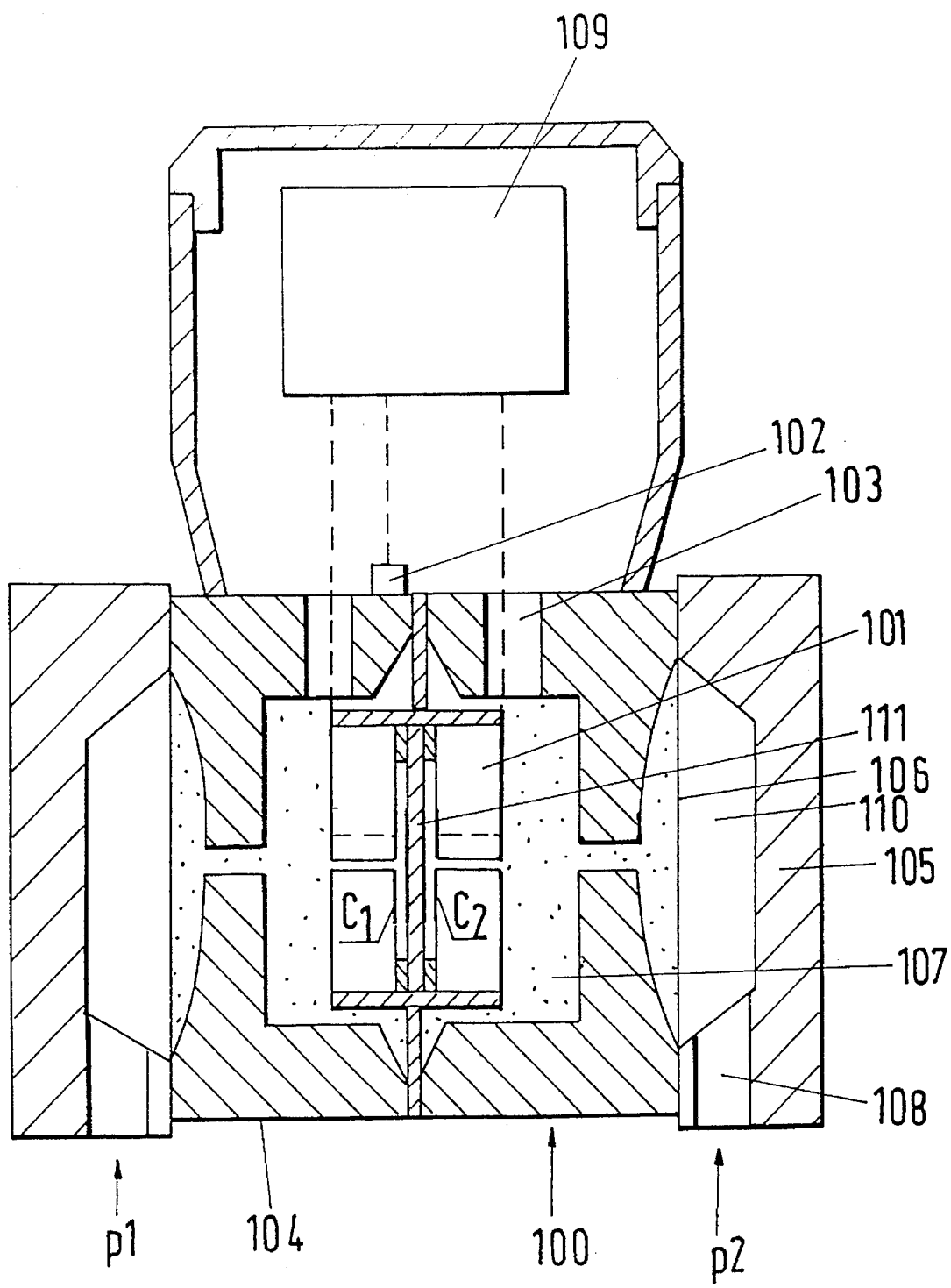
FIG. 2 is a cross-sectional view of a differential pressure measuring transducer connected to a capacitive sensor device in accordance with the present invention.

Referring initially to FIG. 2, a capacitive sensor device 100 is shown connected to a measuring transducer 109. The sensor device 100 comprises a base structure 104 interposed between two caps 105. A differential pressure sensor 101 with a movable measurement diaphragm 111 is arranged within the base structure 104 and surrounded by a fluid 107 as the pressure medium. Each cap 105 has a pressure inlet 108 for the influx of respective first and second process pressures $p_1$ and $p_2$ into a pressure chamber 110 and each pressure chamber 110 is sealed off against the fluid 107 by a respective separation diaphragm 106. The differential pressure sensor 101 has conductive coverings in its interior as well as on the measurement diaphragm 111. These conductive coverings are located substantially parallel to one another and form two electrical capacitors having capacitances $C_1$ and $C_2$. The capacitors are electrically connected to the measuring transducer 109 by electrical lines (as depicted by the dashed lines) which are enclosed within compression-proof passages 103 that exit through a wall of the base structure 104. The sensor arrangement shown in FIG. 2 further includes a temperature sensor 102 for measuring the temperature of the base structure 104, which constitutes the largest thermal storage device of the sensor device 100. The temperature sensor 102 is also electrically connected to the measuring transducer 109 (as depicted by the dashed line).

If the absolute pressure is $p=(p_1+p_2)/2$ and the differential pressure is $dp=p_1-p_2$ it is possible, using the sensor arrangement shown in FIG. 2, to derive the temperature θ, the differential pressure $f(dp)=f(C_1, C_2)$ and the absolute pressure $f(p)=f(C_1, C_2)$,
where $C_1=f(\epsilon_1, dp, p, \theta)$; and $C_2=f(\epsilon_2, dp, p, \theta)$.

Thus, the dielectric constants ∊1 and ∊2 of the fluid 107 between the conductive coverings that form the capacitances $C_1$ and $C_2$ themselves remain pressure-dependent and temperature-dependent. The dependence of the capacitances $C_1$ and $C_2$ on the absolute and differential pressures is the result of distortions, even slight ones, of the base structure 104 during varying pressurization.

In accordance with the invention, the disturbance variables are classified into measurable influence variables. Thus, the target output function (A(E)), relative to the transformation, derivable from the differential pressure sensor 101, of the differential pressure dp into the input function E(dp), is represented by the function $$A(E)=K^*E(dp)+G(E)+R(p, \theta)^*S(p, \theta)$$

where,

K is a constant scaling factor;

G(E) describes non-linear properties of the system;

R(p, θ) is an offset function dependent on the absolute pressure p and the temperature θ;

S(p, θ) is a span function dependent on the absolute pressure p and the temperature θ; and E(dp)=f(G, p, θ) is dependent on non-linearities G, the absolute pressure p and the temperature θ.

In order to correct the transformation functions, which depend on the absolute pressure, of R for offset and S for span, and taking into account the disturbance variables that influence the absolute pressure p, the transformation function of f(p) depends on the sum of the capacitances that can be picked up by the differential pressure sensor $\Sigma C=C_1+C_2$ and is represented by the function $$f(p)=f(\Sigma C, p_1, p_2, \theta)+\Sigma C(\theta)+T(E)$$

where,

ΣC(θ) describes the temperature curve of the capacitance sum; and

T(E) is a level function dependent on the input function E.

Figure 1:
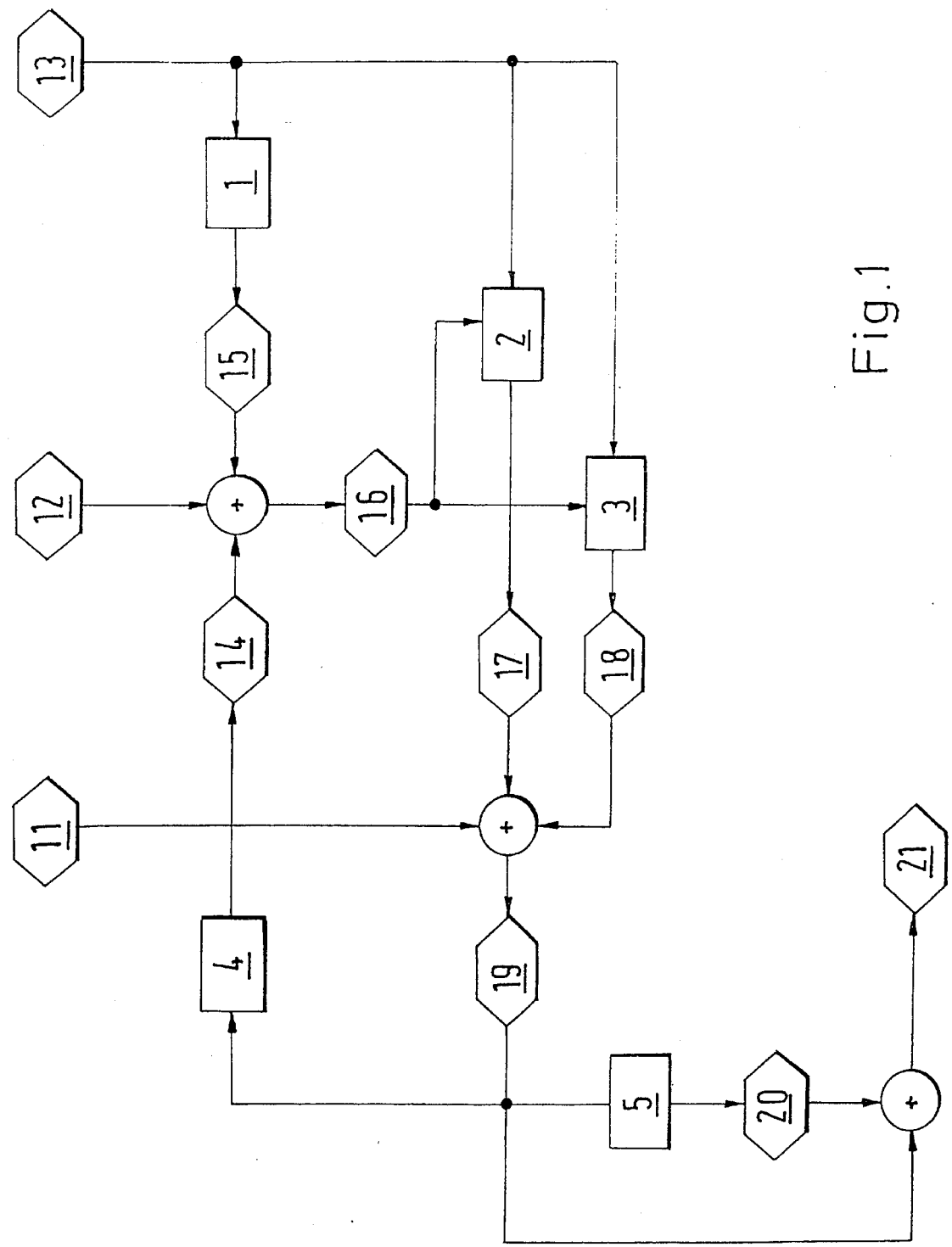
FIG. 1 diagrammatically depicts a process for correcting a differential pressure signal in accordance with the present invention.

The inventive process will now be described with reference to FIG. 1. As depicted in FIG. 1, rectangular symbols indicate polynomials whose coefficients represent a functional dependence of an output function on at least one input function; hexagonal symbols indicate transformation functions; and round symbols indicate combinations of transformation functions, independent of their mathematical combination operations. The input variables comprise a measured differential pressure signal 11, a measured absolute-pressure signal 12, and a temperature signal 13. Specifically, the measured differential pressure signal 11 represents the transformation function of the differential pressure dp into the input function E(dp); the measured absolute-pressure signal 12 represents the transformation function f(p) into the capacitance total; and the temperature signal 13 represents the temperature θ.

Under given process conditions and taking into account the aforementioned dependencies, sets of polynomial coefficients are determined only once for each individual sensor and then stored in memory as constants.

Specifically, the coefficients $d_v$ are determined for a temperature curve correction polynomial 1 of the form $$D(\theta) = \sum_{v=1}^{m_d} d_v f^v(\theta)$$

representing the dependence of the capacitance sum ΣC on the temperature f(θ) and in which the parameter $m_d$ indicates the number of coefficients $d_v$ and, thus, the degree of the polynomial.

In order to correct the offset, which depends on absolute pressure and temperature, the coefficients $r_{v1}$ and $r_{v2}$ are determined for an offset correction polynomial 2 of the form $$R(p, \theta) = R_0 + \sum_{v=1}^{m_r} r_{v1} f^v(p) + \sum_{v=1}^{m_r} r_{v2} f^v(\theta)$$

representing the static curve deviation at the working point, and in which the parameter $m_r$ indicates the number of coefficients $r_v$ and thus the degree of the polynomial sums, and $R_O$ indicates a basic offset under the given process conditions.

In addition, the coefficients $s_{v1}$ and $s_{v2}$ are determined for a span correction polynomial 3 of the form $$S(p,\theta) = \epsilon(p,\theta) + \sum_{v=1}^{m_s} S_{v1} f^v(p) * \sum_{v=1}^{m_s} S_{v2} f^v(\theta)$$

representing the deviation of the relation of the input function to the output function in which the parameter $m_s$ indicates the number of coefficients of each polynomial sum and, thus, the degree of the polynomial.

Furthermore, the coefficients $t_v$ are determined for a level correction polynomial 4 of the form $$T(E) = \sum_{v=1}^{m_l} t_v E^v$$

representing the influence on the capacitance sum of the diaphragm level, which depends on the differential pressure, and in which the parameter $m_l$ indicates the number of coefficients $t_v$ and thus the degree of the level correction polynomial 4.

In a further embodiment of the invention, the coefficients $g_v$ are determined for a linearization polynomial 5 of the form $$G(E) = \epsilon(E) + \sum_{v=1}^{m_g} g_v f^v(E)$$

representing the non-linear curve deviations of the corrected differential pressure signal from the actual differential pressure $dp=p_1-p_2$ in which the parameter mg indicates the number of coefficients of the linearization polynomial 5 and, thus, the degree of the linearization polynomial 5.

The first advantage provided by implementing a plurality of correction polynomials in this manner is a clarity of overview, which is expressed by the fact that each polynomial depends on a maximum of two variables. Secondly, compact polynomials of this type converge sufficiently at a low degree so that adequately accurate offsets are achieved after just a few summation steps.

Thus, and in accordance with the invention, to correct a measured differential pressure signal 11 a corrected differential pressure signal 19 is determined recursively from a measured absolute-pressure signal 12, a temperature signal 13, and the measured differential pressure signal 11 and itself in combination with a temperature curve correction polynomial 1, an offset correction polynomial 2, a span correction polynomial 3 and a level correction polynomial 4.

Specifically, from the corrected differential pressure signal 19, via the level correction polynomial 4, a level-dependent correction signal 14 is calculated, which corresponds to the term T(E) in the transformation function f(p) of the absolute pressure p. Furthermore, from the temperature signal 13, via the temperature curve correction polynomial 1, a temperature curve signal 15 is calculated, which corresponds to the term $f(\Sigma C(\theta))$ in the transformation function f(p) of the absolute pressure p. The measured absolute-pressure signal 12 in combination with the level-dependent correction signal 14 and the temperature curve signal 15 are used to calculate a corrected absolute-pressure signal 16, the transformation function f(p) of which now depends only on the process pressures $p_1$ and $p_2$, as represented by the function $f(p)=f(0, p_1, p_2, 0)$. An offset correction signal 17 is calculated from the corrected absolute-pressure signal 16 and the temperature signal 13 via the offset correction polynomial 2, and a span correction signal 18 is calculated via the span correction polynomial 3. The offset correction signal 17 thereby corresponds to the term R (p, θ) and the span correction signal corresponds to the term S (p, θ) in the transformation function of the differential pressure dp into the input function E(dp). From the combination of the measured differential pressure signal 11, the offset correction signal 17 and the span correction signal 18, the corrected differential pressure signal 19 is recursively determined, which for the transformation of the differential pressure dp into the input function E (dp) is represented by the function $A(E)=K^*E+G(E)$.

In another embodiment, the differential pressure signal may be processed further. More particularly, from the corrected differential pressure signal 19, via a linearization polynomial 5, a linearization correction signal 20 is determined, which corresponds to the term G(E) in the transformation function of the differential pressure dp into the input function E(dp) of the corrected differential pressure signal 19. The corrected differential pressure signal 19 is then combined with the linearization correction signal 20 to generate a linearization differential pressure signal 21, whereby the linearization differential pressure signal 21 represents the transformation of the actual differential pressure dp as an electrical signal $$A(E)=K^*E(dp)$$

where K represents a selectable constant scaling factor.

The process according to the invention is a significant improvement over and distinguishable from previous differential pressure signal correction processes by the implementation of recursivity whereby residual errors are fed back into the correction process with inverted signs, despite the use of relative simple correction polynomials of lower degrees. The use of lower degree polynomials in the inventive process is also advantageous in that it is especially suitable for execution on sequential machines, because the execution cycles are short in a manner proportionate to the degree of the polynomial.

In another embodiment of the invention, during the execution of the process on sequential machines, for one cycle of the time phase $t_n$, the level-dependent correction signal 14 of the previous time phase $t_{n-1}$ is combined with the temperature curve signal 15 of the time phase $t_n$ and the measured absolute-pressure signals 12 of the time phase $t_n$, to produce the corrected absolute-pressure signal 16 of time phase $t_1$. The incorporation of the level-dependent correction signal 14 from the previous time phase $t_{n-1}$ into the correction of the current time phase $t_n$ is especially advantageous because the absolute dimension and the relative changes of this correction signal are relatively small compared to the other parameters to be combined.

Thus, while there have been shown and described and pointed out fundamental novel features of the invention as applied to preferred embodiments thereof, it will be understood that various omissions and substitutions and changes in the form and details of the devices and processes illustrated and described, and in their operation, may be made by those skilled in the art without departure from the spirit of the invention. For example, it is expressly intended that all combinations of those elements and/or method steps which perform substantially the same function in substantially the same way to achieve the same results are within the scope of the invention. It is the intention, therefore, to be limited only as indicated by the scope of the claims appended hereto.

I claim:

1. A process for correcting a differential pressure signal, under given process conditions, that is dependent on temperature and static pressure, comprising the steps of:

continuously calculating a first pressure signal and a second pressure signal with a differential pressure measuring transducer;

detecting a temperature in the differential pressure measuring transducer;

calculating a measured absolute pressure signal representing an average of the first and second pressure signals;

calculating a measured differential pressure signal representing a difference between the first and second pressure signals;

determining, for each dependency of the differential pressure signal on temperature and static pressure, sets of polynomial coefficients of a plurality of correction polynomials, under the given process conditions, representing correction values for the temperature and the measured absolute pressure signal; and recursively calculating a corrected differential pressure signal from the measured differential pressure signal, the measured absolute-pressure signal, the temperature and the corrected differential pressure signal using the plurality of correction polynomials.

2. The process of claim 1, wherein the step of recursively calculating the corrected differential pressure signal comprises the steps of:

calculating a level-dependent correction signal from the corrected differential pressure signal using a level correction polynomial;

calculating a temperature curve signal from the temperature using a temperature curve correction polynomial;

calculating a corrected absolute-pressure signal from the measured absolute-pressure signal in combination with the level-dependent correction signal and the temperature curve signal;

calculating an offset correction signal from the corrected absolute-pressure signal and the temperature, using an offset correction polynomial;

calculating a span correction signal from the corrected absolute-pressure signal and the temperature, using a span correction polynomial;

combining the measured differential pressure signal with the offset correction signal and the span correction signal.

3. The process of claim 2, wherein the temperature curve correction polynomial is $$D(\theta) = \sum_{v=1}^{m_d} d_v f^v(\theta)$$

where $\theta$ is temperature;

$d_v$ are coefficients; and $m_d$ is representative of a degree of the temperature curve correction polynomial.

4. The process of claim 3, wherein the offset correction polynomial is $$R(p, \theta) = R_0 + \sum_{v=1}^{m_r} r_{v1} f^v(p) + \sum_{v=1}^{m_r} r_{v2} f^v(\theta)$$

where p is absolute pressure;

$\theta$ is temperature;

$r_{v1}$ and $r_{v2}$ are coefficients; and $m_r$ is representative of a degree of the offset correction polynomial.

5. The process of claim 4, wherein the span correction polynomial is $$S(p,\theta) = \epsilon(p,\theta) + \sum_{v=1}^{m_s} s_{v1} f^v(p) * \sum_{v=1}^{m_s} s_{v2} f^v(\theta)$$

where p is absolute pressure;

$\theta$ is temperature;

$\epsilon$ is a dielectric constant;

$s_{v1}$ and $s_{v2}$ are coefficients; and $m_s$ is representative of a degree of the span correction polynomial.

6. The process of claim 5, wherein the level correction polynomial is $$T(E) = \sum_{v=1}^{m_l} t_v E^v$$

where E is an input function;

$t_v$ are coefficients; and $m_l$ is representative of a degree of the level correction polynomial.

7. The process of claim 2, further comprising the steps of:

calculating a linearization correction signal from the corrected differential pressure signal, using a linearization correction polynomial; and combining the corrected differential pressure signal with the linearization correction signal to produce a linearization differential pressure signal.

8. The process of claim 6, further comprising the steps of:

calculating a linearization correction signal from the corrected differential pressure signal, using a linearization correction polynomial; and combining the corrected differential pressure signal with the linearization correction signal to produce a linearization differential pressure signal.

9. The process of claim 8, wherein the linearization correction polynomial is $$G(E) = \epsilon(E) + \sum_{v=1}^{m_g} g_v f^v(E)$$

where E is an input function;

$\epsilon$ is a dielectric constant;

$g_v$ are coefficients; and $m_g$ is representative of a degree of the linearization correction polynomial.

10. The process of claim 2, wherein:

the measured differential pressure signal, the measured absolute-pressure signal and the temperature signal are measured in a time-discrete manner; and the corrected absolute-pressure signal, at a time $t_n$, is determined cyclically from the measured absolute-pressure signal at a time $t_n$, the temperature signal at a time $t_n$ and the corrected differential pressure signal at a time $t_{n-1}$.

11. The process of claim 7, wherein:

the measured differential pressure signal, the measured absolute-pressure signal and the temperature signal are measured in a time-discrete manner; and the corrected absolute-pressure signal, at a time $t_n$, is determined cyclically from the measured absolute-pressure signal at a time $t_n$, the temperature signal at a time $t_n$ and the corrected differential pressure signal at a time $t_{n-1}$.

12. The process of claim 1, further comprising the step of storing the set of polynomial coefficients in a memory device.

\* \* \* \* \*